United States Patent [19]

Müller et al.

[11] Patent Number: 5,670,835
[45] Date of Patent: Sep. 23, 1997

[54] COOLING APPARATUS FOR AN AC GENERATOR

[75] Inventors: Robert Müller, Dillingen; Uwe Mühlberger, Hidenheim; Bernhard Wüst, Steinheim, all of Germany

[73] Assignee: J.M. Voith GmbH, Heidenheim, Germany

[21] Appl. No.: 721,003

[22] Filed: Sep. 26, 1996

Related U.S. Application Data

[63] Continuation of Ser. No. 325,808, Oct. 19, 1994, abandoned.

[30] Foreign Application Priority Data

Oct. 20, 1993 [DE] Germany .......... 43 35 848.9

[51] Int. Cl.⁶ .................................................. H02K 5/24
[52] U.S. Cl. .......... 310/58; 310/60 A; 310/268
[58] Field of Search ............ 310/54, 58, 60 A, 310/64, 268

[56] References Cited

U.S. PATENT DOCUMENTS

| | | | |
|---|---|---|---|
| 2,345,850 | 4/1944 | Winther | 172/284 |
| 2,407,504 | 9/1946 | Martin | 188/104 |
| 2,473,259 | 6/1949 | Potts | 188/104 |
| 4,168,445 | 9/1979 | Hatch | 310/219 |
| 4,275,323 | 6/1981 | Hatch | 310/52 |
| 4,757,224 | 7/1988 | McGee et al. | 310/168 |
| 4,973,868 | 11/1990 | Wust | 310/51 |
| 5,051,641 | 9/1991 | Weh | 310/163 |
| 5,289,072 | 2/1994 | Lange | 310/266 |

FOREIGN PATENT DOCUMENTS

| | | | |
|---|---|---|---|
| 0 253 903 | 1/1988 | European Pat. Off. | 310/54 |
| 0 461 905 | 12/1991 | European Pat. Off. | 310/54 |
| 0 461 906 | 12/1991 | European Pat. Off. | 310/54 |
| 9 206 528 | 4/1992 | WIPO | 310/60 A |

*Primary Examiner*—Thomas M. Dougherty
*Attorney, Agent, or Firm*—Marshall, O'Toole, Gerstein, Murray & Borun

[57] ABSTRACT

A cooling apparatus is provided for an AC generator, particularly for a transverse-flow generator having a stator with at least one armature winding, as well as a rotor disposed opposite the armature winding. Collector rings are secured to a carrier disk attached to a rotor shaft. The collector rings have a plurality of polarized magnets and magnetizable collector elements in alternating sequence disposed therein. At least one cooling channel through which a coolant can flow is provided in the vicinity of the carrier disk. The cooling channel is separated from the carrier disk only by a channel cover which has a minimal thickness and by the air gap between the rotor and the stator.

5 Claims, 2 Drawing Sheets

COOLING APPARATUS FOR AN AC GENERATOR

This is a continuation of pending U.S. application Ser. No. 08/325,808, filed Oct. 19, 1994, now abandoned.

BACKGROUND OF THE INVENTION

1. Field of the Invention

The invention relates to cooling apparatus for an AC generator and in particular a transverse-flow generator.

2. Description of Related Technology

AC generators that are also known as transverse-flow generators are known in the art. Such generators may include a stator with at least one armature winding and a rotor opposite the armature winding. The rotor periphery may include a plurality of polarized magnets and magnetizable collector elements in alternating sequence in an arrangement of collector rings. A carrier disk can be attached to a rotor shaft, the collector rings being attached to the carrier disk. Cooling devices are connected to the stator. Such transverse-flow generators are described, for example, in DE 37 05 089 (corresponding to Weh, U.S. Pat. No. 5,051,641). During the operation of such a generator, heat is generated both in the stator and in the rotor due to power losses that occur in the windings and magnet cores produced by induced eddy currents and circular currents in the rotor. The situation is critical, particularly in generators which operate at high load and high rpm.

It is known to connect cooling devices to the stator and in this way reduce the heating of the generator and its components. However, due to the spatial arrangement of the stator and the rotor, it is very difficult to provide cooling devices in certain regions of the generator, such as the rotor, that are not very accessible.

SUMMARY OF THE INVENTION

It is an object of the invention to overcome one or more of the problems described above. It is also an object of the invention to provide a cooling apparatus for an AC generator, particularly a transverse-flow generator, that provides effective cooling of the generator, particularly the generator rotor.

According to the invention a cooling apparatus for an AC generator is provided. The generator includes a stator with at least one armature winding and a rotor having a shaft and a periphery. The rotor is disposed opposite the armature winding. Collector rings having a plurality of polarized magnets and magnetizable collector elements in an alternating sequence disposed therein are disposed at the periphery of the rotor. A carrier disk is secured to the rotor shaft and is co-axial therewith. The collector rings are secured to the carrier disk. Cooling devices are connected to the stator. According to the invention, the cooling devices define at least one cooling channel disposed in the vicinity of the carrier disk in the stator and through which a coolant flows. The cooling channel is separated from the carrier disk by a channel cover of minimal thickness and by an air gap located between the rotor and the stator.

Other objects and advantages of the invention will be apparent to those skilled in the art from the following detailed description taken in conjunction with the drawings and the appended claims.

DETAILED DESCRIPTION OF THE INVENTION

Figure 1:
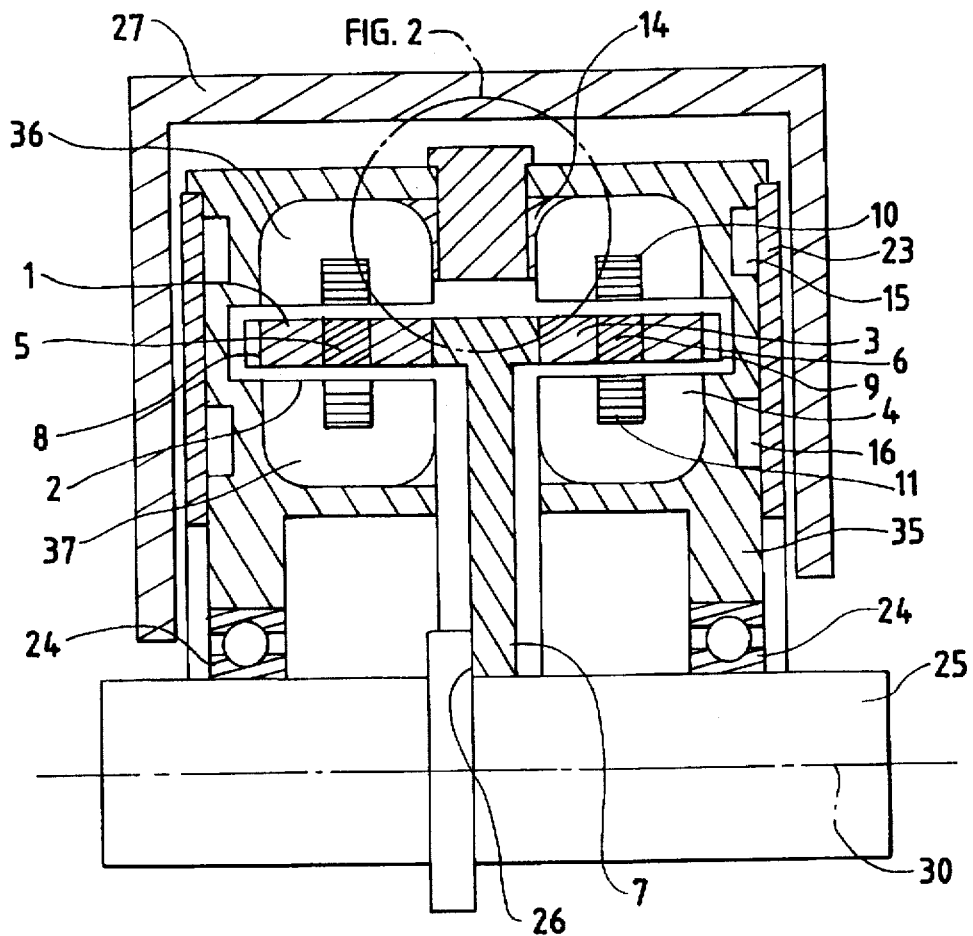
FIG. 1 is a is a partially schematic longitudinal sectional view of an AC generator known in the art.

According to the invention, a cooling apparatus for a generator is designed to have cooling devices with at least one cooling channel disposed in the vicinity of a carrier disk in a stator of the generator through which a coolant can flow. Also, each cooling channel is separated from the carrier disk only by a channel cover of minimal thickness and by an air gap between the generator rotor and stator. In this way, effective cooling of the rotor is achieved, particularly in its central region, which is difficult to access from the outside and which lies tightly against the points at which the heat is generated in the rotor during the operation thereof. The removal of heat can be satisfactorily controlled by adjusting the temperature and the throughput of the coolant.

In another embodiment of an apparatus according to the invention, each cooling channel has a broad cross-sectional area so that the dimensions of the channel that run parallel to the carrier disk extend over a significant region of the carrier disk disposed opposite the channel. In this way, heat can be removed from the rotor over a large surface area. At the same time, the cooling channels, which are built into the stator, also ensure cooling of the stator.

In a preferred embodiment of an apparatus according to the invention, at least one cooling channel runs co-axially with the rotor axle and is built into a spacer disk disposed between a pair of stator sections. The spacer disk is disposed radially opposite and symmetrically to the carrier disk and is thermally insulated from the stator sections. In this way, controlled cooling of the carrier disk occurs in the region in which the carrier disk borders a collector ring in which otherwise undesirable heating would occur. As a result of the thermal insulation, cooling is limited locally and thus is particularly effective locally.

In a further embodiment of an apparatus according to the invention, the spacer disk is made of a material which is magnetically passive and has good thermal conductivity. Furthermore, the spacer disk has broad, essentially radial cavities on both sides of the cooling channel, which cavities form thermal insulation against the neighboring regions of the stator. These measures serve to provide controlled localization of the cooling action on the rotor.

In a further embodiment of an apparatus according to the invention, the cavities may be filled with air or with another insulating material. Gaseous, liquid, and solid insulating materials can be used to provide thermal screening against the neighboring regions of the stator.

In a further embodiment of an apparatus according to the invention, at least one cooling channel is disposed in a radial direction in the body of the base of the stator and opposite to the carrier disk. In this way, a large-area, radial region of the carrier disk of the rotor is utilized for cooling purposes.

In a preferred embodiment of an apparatus according to the invention, the carrier disk has a cavity disposed on a side opposite to a particular cooling channel. This cavity is radially directed and provides thermal insulation to the neighboring region of the stator. In this way, controlled localization of the cooling action on the carrier disk of the rotor can be achieved.

In another preferred embodiment, a pair of opposite radial cooling channels are provided on the two sides of the carrier disk. In this way, a symmetrical apparatus is obtained with uniform cooling of the rotor.

In a further embodiment of an apparatus according to the invention, complementary meshing teeth are provided on the carrier disk and in the regions of the stator that lie opposite to the region of the cooling channels. These teeth have essentially parallel surfaces and are separated from one another by air gaps. In this way, the effective surface for removal of heat is increased considerably and the cooling action is advantageously supported. The teeth may have rectangular, trapezoidal or triangular cross sections. The air gap between the teeth should be sufficiently large in order to reliably prohibit mechanical contact of the teeth during operation.

Furthermore, in an apparatus according to the invention, it is expedient to have the carrier disk comprise a magnetically passive material having good thermal conductivity, particularly when the disk is made of a suitable metal. As a result, removal of heat from the particular collector ring is supported, so that the respective cooling channels can operate more efficiently.

In a further embodiment of an apparatus according to the invention, the materials of the opposite components in the region of the cooling channels receive a surface treatment in order to increase the degree of emission. In this way, heat transfer by radiation is advantageously supported.

In another preferred embodiment of an apparatus according to the invention, instead of the measures described above or in addition to such measures, a rotor with a preferred construction can be used wherein the carrier disk attached to the rotor includes at least one pair of collector rings at a periphery thereof which are connected by an insulating ring made of magnetically passive and electrically nonconducting material. Incorporated into the insulating ring are storage cells filled with a phase-transition material, the melting point or boiling point of which is below a predetermined temperature.

The amount of the phase-transition material is chosen as a function of the extent of the loads that occur during operation of the generator. The fact that such phase-transition materials consume heat energy when a phase transition from solid to liquid or liquid to gas occurs is utilized here. As long as energy is taken up during the phase transition, further temperature increase is prevented until the phase transition is completed.

It is preferred that the phase-transition material has a transition temperature below the critical temperature of the permanent magnets disposed in the collector rings. In this way, an increase of the temperature beyond the critical temperature of the permanent magnets is prevented and thus the permanent magnets are protected against damage. Also, such a transition temperature avoids the necessity of using permanent magnets with particularly high critical temperatures and this has an advantageous effect on the cost of the apparatus.

In a further embodiment of an apparatus according to the invention, the phase-transition material is both electrically and magnetically passive. Thus, the electrical and magnetic behavior of the rotor will not be adversely influenced.

In a preferred embodiment of an apparatus according to the invention, the phase-transition material is either sulfur or iodine. These materials have phase transition temperatures which are sufficiently low for permanent magnets made of NdFeB that are often utilized in generators. Then, it is not necessary to use permanent magnets with higher limiting temperatures, for example, those made of SmCo.

In a further embodiment of an apparatus according to the invention, additional cooling channels are incorporated in the body of the base of the stator at the axial front faces and/or on the radial outside surfaces thereof. A coolant can be made to flow through such cooling channels. These additional cooling channels advantageously contribute not only to the cooling of the stator, but also have an indirect cooling action on neighboring regions of the rotor.

In such apparatus according to the invention, the respective cooling channels can be axial (i.e. parallel to the rotor axis) or radial and can be connected to the corresponding coolant supply devices.

The use of a phase-transition material in the respective storage cells of the rotor provides a buffer action which is particularly suitable for equalizing high thermal loads on the rotor occurring only for a short time and at relatively long time intervals. The phase-transition materials make it possible to utilize the melting or vaporization enthalpy thereof for the purpose of buffering the peak loads. These phase-transition materials are chosen so that their melting point or boiling point is somewhat below a predetermined temperature, which can be calculated from the critical temperature of the magnet, as well as from the temperature gradients that develop between the collector ring with magnets on the one hand and the storage cells on the other hand.

When the temperature of the collector rings and the magnets increases as a result of a thermal (peak) load to the predetermined temperature, the melting point or boiling point of the material enclosed in the storage cells will be reached. Further increase in temperature is prevented by the fact that energy is taken up during the phase transition from solid to liquid or from liquid to the gaseous state, until the phase transition is completed. During the subsequent period of low thermal load on the rotor, the energy taken up by the storage cells will be released again so that the transition back to the solid or liquid phase can occur.

These phase transitions can occur at any arbitrary number of times in one or the other direction. It is important only that based on the amount of material used on the one hand and the predetermined phase transition temperature on the other hand, sufficient buffering action is ensured during operation of the generator.

With reference to the drawings, an AC generator (transverse-flow) is shown in FIG. 1. A stator has a base body 35 in which radial outer and inner armature windings 10 and 11 are applied, running in the peripheral direction. The armature windings 10 are surrounded by axial magnetic cores, particularly by C-cores, which conduct the magnetic flux. The base body 35 is made from a magnetically passive material and the securing of the armature windings 10 and 11 as well as of the magnetic cores 36 and 37 is accomplished in a suitable manner, for example, by using a casting material 14, indicated schematically.

Cooling channels 15 and 16, indicated schematically, are disposed on axial front faces of the stator. These channels are closed on the outside with a cover 23. The cooling channels come from an outer screen 27, in a manner which is not shown, and are connected to a supply of coolant which is introduced at a suitable throughput and appropriate feed temperature.

The stator surrounds a rotor which has a plurality of polarized magnets and magnetizable collector elements in alternating sequence at a periphery thereof in an arrangement of collector rings 1 and 2 as well as 3 and 4. The collector rings are disposed on a radial carrier disk 7 on both sides in the embodiment shown here. The carrier disk 7 is secured with an attachment 26 onto a rotor shaft 25. The rotor shaft 25 is supported by a bearing arrangement 24 on the base body 35 of the stator and is designed to be able to rotate around a rotor axis 30.

In the embodiment of a generator shown in FIG. 1, the rotor has a pair of collector rings 1 and 2 on one side of the carrier disk 7 and collector rings 3 and 4 on the other side thereof. The collector rings 1 and 2 being connected to an insulating ring 5, and the rings 3 and 4 being connected to an insulating ring 6. The rings 5 and 6 are made of magnetically passive and electrically nonconducting material, preferably of plastic. On the front face thereof, the rotor is closed with end rings 8 and 9, which are made of magnetically passive materials similar to the carrier disk 7.

During the operation of an apparatus shown in FIG. 1, eddy currents and circular currents are induced in the rotor so that the rotor becomes heated. Situations at high load and particularly at high rpm are critical. Although the stator is cooled with a coolant through the cooling channels 15 and 16 so that the heating of the stator is sufficiently prevented, cooling of the rotor can be performed only indirectly, i.e., through regions of the base body 35 which are disposed opposite to the rotor, thus, essentially in the region of the frontal end rings 8 and 9.

However, most of the heat is produced in the region of the collector rings 3 and 4, as well as the rings 1 and 2, which are far removed from the cooling channels 15 and 16. Conduction of heat from the collector rings 2 and 3 to the axially disposed collector rings 1 and 4 is made more difficult by the fact that the insulating rings 5 and 6 are necessarily made of materials that conduct heat poorly. However, for physical reasons, it is not possible to replace the insulating material of the rings 5 and 6 with materials exhibiting good thermal conductivity because such materials are also electrically conducting as a rule and thus would have an adverse influence on the functioning ability of the generator. Furthermore, there is poor heat transfer (convection) in the air gap between the rotor and the stator.

Figure 2:
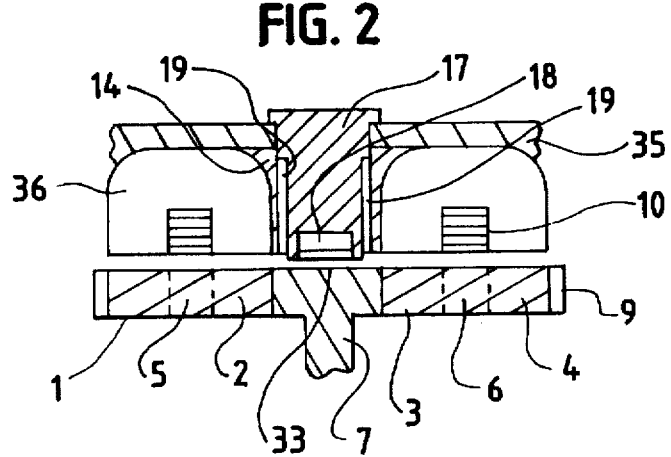
FIG. 2 is a partial longitudinal sectional view of the apparatus shown in FIG. 1 shown with cooling apparatus according to the invention.

A preferred embodiment of a cooling apparatus according to the invention is shown in FIG. 2, which is identical in construction to the apparatus shown in FIG. 1 with the exception of that portion of the apparatus illustrated in FIG. 2. Therefore, the same reference numbers are used as in FIG. 1 for the same features. Additionally, the apparatus according to FIG. 2 shows the following:

A spacer disk 17 is disposed at a radially outer side of the rotor between the two halves of the stator. The spacer disk 17 is secured to the base body 35 with the casting material 14. The spacer disk 17 has a broad cooling channel 18 on its radial inside region; this channel is separated from the opposite region of the carrier disk 7 only by a channel cover 33, which has a small (i.e. thin) wall thickness. In this way, conduction of heat from the rotor can be achieved practically over the entire axial width of the spacer disk 17 and along the entire periphery around the carrier disk 7. The carrier disk 7 of the rotor expediently consists of material which has good thermal conductivity, but is magnetically passive, for example, suitable metals. In this way, the heat produced in the collector rings 2 and 3 during the operation of the generator can be led away efficiently by a coolant which flows through the cooling channel 18.

In a preferred embodiment, as shown in FIG. 2, it may be expedient to thermally insulate the cooling channel 18 in the axial direction against the neighboring regions of the stator. For this purpose, broad-area cavities are provided running essentially in a radial direction; these cavities form a thermal insulation 19 against the neighboring regions of the stator. These cavities can be filled either with air or another insulating material having a gaseous, liquid or solid form. In this way, locally controlled cooling action is exerted on the opposite region of the rotor.

Figure 3:
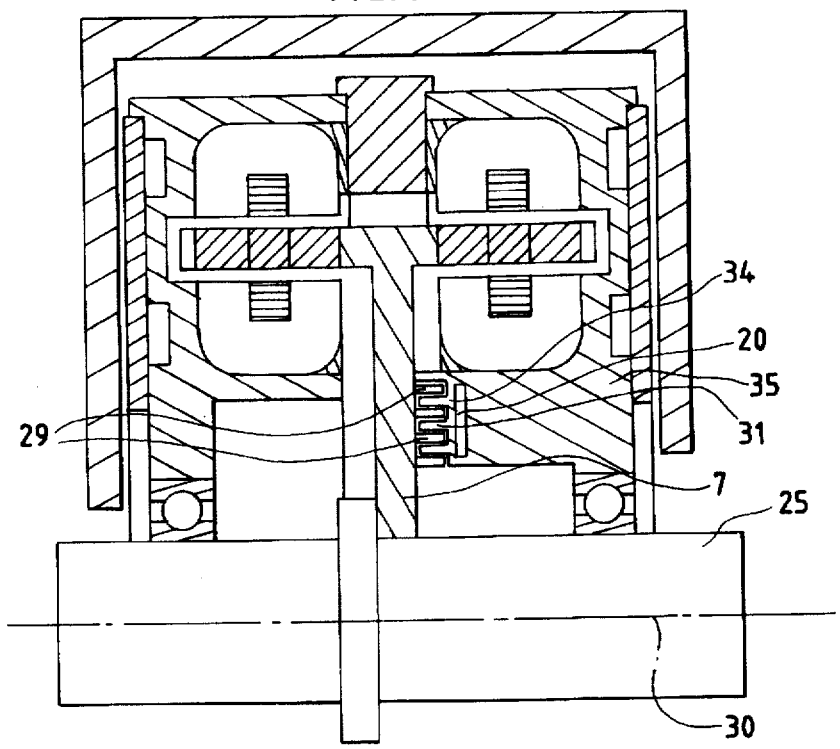
FIG. 3 is a partially schematic longitudinal sectional view of an AC generator and a second embodiment of a cooling apparatus according to the invention.

FIG. 3 shows another preferred embodiment of a cooling apparatus according to the invention which largely corresponds in structure to the embodiment of a generator shown in FIG. 1. Therefore, only the differences between the two apparatus will be discussed below.

Alternatively or in addition to the cooling channel 18 shown in FIG. 2, in the embodiment according to FIG. 3, a radial broad-surfaced cooling channel 20 is disposed in the body 35 opposite to a corresponding region of the carrier disk 7 of the rotor. At this point, the entire material height of the base body 35 extending between the rotor shaft 25 and the magnetic core and located opposite the carrier disk 7 can be utilized for the channel 20. Additionally two similar cooling channels 20 can be provided on either side of the carrier disk 7, whereby they will be separated from the air gap which is provided between rotor and stator only by the channel cover 34, which has a minimal thickness.

Furthermore, such a cooling channel 20 can also be insulated from the base body 35 in the axial direction in a manner not shown, for example, by providing a thermal insulation which corresponds to the thermal insulation 19 in the region of the spacer disk 17 when a locally controlled cooling action is to be provided on the carrier disk 7.

In addition, the cooling can also be supported in the region of the respective cooling channel 20 by the fact that the carrier disk 7, on the one hand, and the base body 35, on the other hand, have complementary meshing teeth 29 and 31 which are arranged so that they do not come into contact with one another and are always separated from one another by an air gap. In this way, a preferred large-area cooling action is achieved in the region of the cooling channel 20.

In an embodiment (not shown) such an arrangement of complementary, meshing teeth can also be provided in the region of the spacer disk 17 which is disposed opposite the carrier disk 7. In this case, the cooling channel would be displaced further outward in the radial direction in order to make the placement of such teeth possible.

Figure 4:
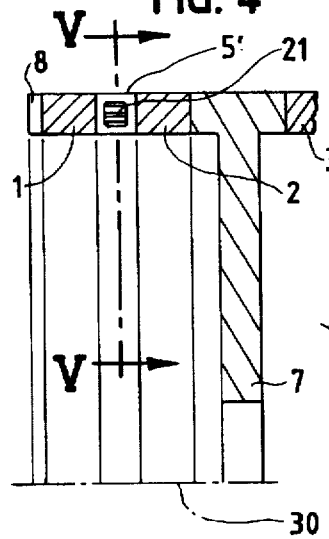
FIG. 4 is a partially schematic longitudinal sectional view of a rotor of an AC generator and a third embodiment of a cooling apparatus according to the invention.
Figure 5:
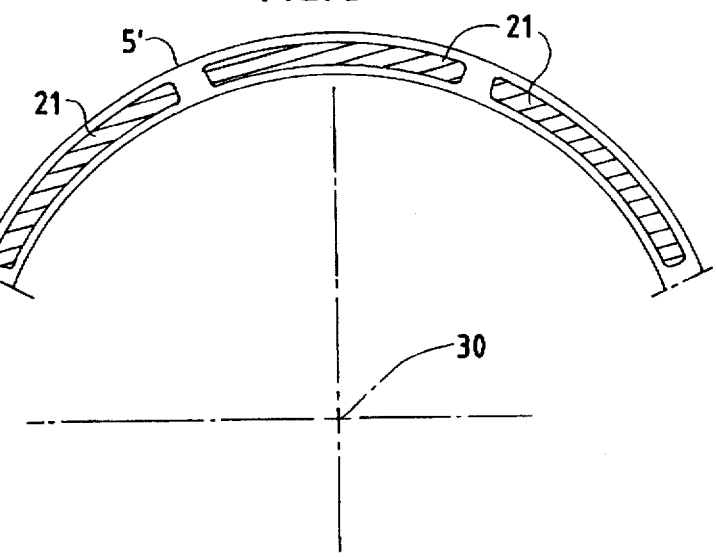
FIG. 5 is a sectional view taken along the line V—V of FIG. 4.

A preferred embodiment of a rotor for a cooled AC generator according to the invention is shown in FIGS. 4 and 5. FIG. 4 shows a partial longitudinal section through the rotor while FIG. 5 shows a cross-section thereof.

Two collector rings 1 and 2 on the carrier disk 7 are shown in FIG. 4. The rings 1 and 2 are separated from each other by an insulating ring 5', but they are mechanically connected. As shown in FIG. 5, this insulating ring 5' contains a plurality of storage cells 21 which are distributed over the periphery of the insulating ring 5'. The storage cells 21 contain phase-transition material, the melting point or boiling point of which is below a predetermined temperature. In practice, this predetermined temperature is chosen expediently in such a way that it lies below the critical temperature of the permanent magnets which are embedded, for example, into the collector rings 1 and 2. These phase-transition materials are chosen so that they are magnetically and electrically passive for the given purpose so that they do not have an adverse influence on the electrical and magnetic properties of the rotor in any way. For example, for special purposes, sulfur or iodine are suitable as phase-transition materials because they have a phase transition temperature of a suitable value in order to buffer permanent magnets made of materials that are frequently used, for example, NdFeB. The mode of action of these phase-transition materials has already been explained in detail herein.

Only one insulating ring 5 with storage cells 21 is shown in FIG. 4. However, the apparatus is in no way limited to such an insulating ring with phase-transition materials. Expediently, a symmetrical arrangement is provided, whereby the particular insulating rings 5 and 6 are designed correspondingly and include storage cells 21 filled with phase-transition materials.

It is also possible to vary such an apparatus by using a larger number of collector rings and insulating rings that can be connected and arranged behind one another in the axial direction.

A rotor according to FIGS. 4 and 5 is particularly suitable for compensating briefly occurring thermal loads on the rotor. By correspondingly dimensioning the insulating rings with the storage cells 21 filled with phase-transition material, however, such embodiments can also be used for permanent loads when a sufficient amount of phase-transition material is incorporated in the apparatus. Then the usual cooling devices can have a somewhat smaller dimension.

The foregoing detailed description is given for clearness of understanding only, and no unnecessary limitations should be understood therefrom, as modifications within the scope of the invention will be apparent to those skilled in the art.

We claim:

1. In a cooling apparatus for an AC generator, said AC generator comprising a stator with at least one armature winding, a rotor having a shaft and a periphery, said rotor disposed opposite the armature winding, collector rings having a plurality of polarized magnets and magnetizable collector elements in an alternating sequence, said rings disposed at the periphery of the rotor, a carrier disk secured on the rotor shaft and co-axial therewith, said collector rings being secured to said carrier disk, and cooling devices connected to the stator, the improvement wherein the carrier disk comprises at least one pair of collector rings connected by an insulating ring made of magnetically passive and electrically nonconducting material, and wherein storage cells are disposed in the insulating ring, said storage cells being filled with a phase-transition material having a melting point or a boiling point below a predetermined temperature.

2. The improvement of claim 1 wherein the phase-transition material has a transition temperature below a critical temperature of the magnets.

3. The improvement of claim 1 wherein the phase-transition material is electrically and magnetically passive.

4. The improvement of claim 1 wherein the phase-transition material is selected from the group consisting of sulfur and iodine.

5. The improvement of claim 1 wherein the stator comprises a base body having axial front faces and radial outside surfaces and wherein said base body defines additional cooling channels disposed on at least one of the axial front faces and the radial outside surfaces wherein coolant flows through said additional cooling channels.

* * * * *